Aug. 8, 1961 G. F. FRANK 2,995,735
LOGIC CIRCUITS
Filed Oct. 26, 1959
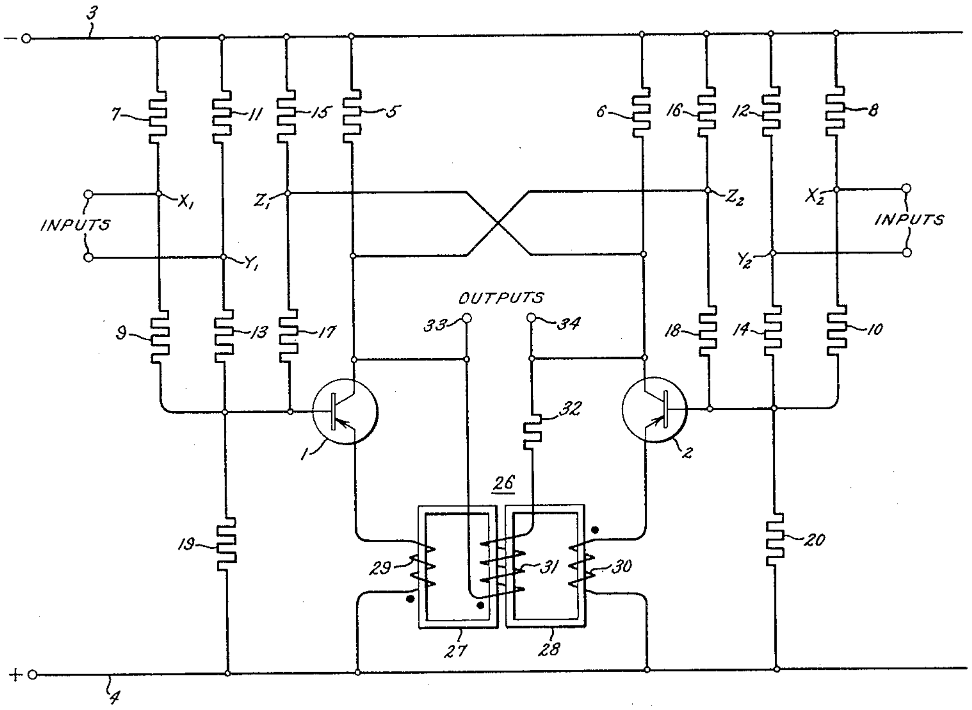
Inventor:
Gerald F. Frank,
by William D Roberson
His Attorney.

United States Patent Office 2,995,735

Patented Aug. 8, 1961

2,995,735

LOGIC CIRCUITS

Gerald F. Frank, Bloomington, Ill., assignor to General Electric Company, a corporation of New York Filed Oct. 26, 1959, Ser. No. 848,737
6 Claims. (Cl. 340—174)

This invention relates to electrical control circuits and more particularly to static or contactless circuits for performing a logical control function in decision making electrical equipment. Circuits of this general category are useful, for example, in automatic and semi-automatic operation of industrial tools and machinery.

The particular control function with which this invention is concerned is identified as the Memory function. A Memory unit as the name implies is one which "remembers" which of various signal input conditions last existed in its input circuits. Such units are usually capable of being switched between two stable electrical output conditions corresponding to different input signals and of remaining in the prevailing output condition whenever the input signals are removed. One type of Memory unit having an output signal which is turned on by a momentary input signal in one of its input channels and turned off by a momentary signal in another of its input channels is disclosed in U.S. Patent 2,856,545, issued on October 14, 1958, to Charles J. Adams and Russell A. Brown and assigned to the assignee of the present invention. Another type of Memory unit may, instead of turning its output signal off and on, reverse the output signal polarity with changes in the input signal conditions. Memory units constructed in accordance with the present invention may function in either manner.

A characteristic very often found desirable in a Memory unit is that it should be capable of remembering its last condition even in the event of total loss and subsequent restoration of power. That is, it should have a "permanent memory." A latching relay is, in essence, an electromechanical Permanent Memory unit physically latched in its last output condition. A latching relay is undisturbed by interruptions in the power supply because it does not rely upon the power supply for its continued operation. Circuits which provide the advantages of contactless switching, however, are affected by power failure since their electrical characteristics depend to some extent upon the source of power. The Memory unit shown and described in the aforesaid patent is in the form of a magnetic amplifier and derives its ability to retain a reliable memory after power failure, that is its permanent memory, from the positive or negative saturation condition which continues to exist in the magnetic core even when power is removed.

In each of these cases, the latching relay and the magnetic amplifier, a physical change in the memory device is responsible for the ability of the device to "remember." In the first case the physical change involves the movement of mechanical members to latch the relay in one or the other condition, while in the second case the physical change involves variations in the magnetic state of the saturable core.

In Memory circuits employing transistors or other electronic valves, it is found that the ability of the circuit to remember depends on the state of conductivity of the valve; this state in turn depends on the availability of power. Consequently, in the event of power failure the valves all revert to a non-conducting condition. Upon restoration of power the memory of such circuits is at best ambiguous. It is said that these circuits have no permanent memory.

It is a general object of this invention to provide Memory circuits employing transistors or other electronic valves and endowed with a reliable permanent memory unaffected by interruptions in the power circuit.

Another object of the invention is to provide a symmetrical transistorized Permanent Memory circuit having a rapid response to input signals.

By way of a brief summary of but one embodiment of the present invention I provide a circuit having two transistors cross-connected as a flip-flop; that is, the collector of each transistor is connected to provide an input signal to the base of the other transistor, so that turning one transistor "on" results in turning the other transistor "off." In combination with the basic circuit a saturable magnetic core structure is provided having two cores adjacent each other. Each of the cores is encircled by a different impedance winding connected in series with one of the transistors. A third saturating winding connected between the two collectors encircles both cores, and the polarity of the windings is chosen such that the cores are saturated in one direction when one transistor is conducting and in the other direction when the other transistor is conducting. In the event of failure and subsequent restoration of power the remanence of the core structure is such that it favors current flow through the transistor which was last conducting by causing the winding in circuit with the other transistor to present a high impedance to current flow.

Application S.N. 103,586 filed April 17, 1961, by George N. Halpin entitled "Transistor Flip Flop Circuit with Memory" and assigned to the assignee of this application, discloses and broadly claims an arrangement wherein a saturable reactor is associated with a flip flop circuit to cause the circuit to assume the same conductive condition it had prior to a power interruption after restoration of power. The invention of said George N. Halpin was made prior to my invention and, therefore, I make no claim herein to said broad invention of George N. Halpin and claim only a specific form of said broad invention.

Further details of the present invention as well as additional objects and advantages will be comprehended better in connection with the accompanying drawing which represents a transistorized modular Permanent Memory logic circuit constructed in accordance with this invention.

The circuit of FIG. 1 includes a pair of transistors 1 and 2 connected in parallel across a source of D.C. potential represented by negative power lead 3 and positive power lead 4 through load impedances 5 and 6 respectively. Each of these transistors is adapted to be operated as a switch to gate currents to its respective load impedance. For the purposes of this discussion it will be assumed that a transistor is "on" when it operates as a low impedance device and as "off" when it switches to a high impedance condition. For controlling its conductivity each transistor in this embodiment has associated with it a group of three input terminals X1, Y1, Z1 and X2, Y2, Z2 respectively. Each transistor provides an output current to its associated load device when no input signals are present at its input terminals or when input signals are present at less than all of its input terminals. But when all the input terminals of a given transistor are provided with input signals the transistor switches to its high impedance condition turning off the output currents to its associated load device.

The aforesaid input terminals are connected in respective voltage dividing base channels connected between the base of a transistor and the negative side of the D.C. power source. In the drawing the odd numbers 7 through 17 identify resistors in the voltage dividing base channels associated with transistor 1 while the even numbers 8 through 18 identify corresponding resistors associated with transistor 2. In the absence of an input signal each one of these three base channels associated with a given one of the two transistors provides a forward bias of that transistor's base electrode, permitting the transistor to be driven into saturation by the D.C. power source represented by power leads 3 and 4. To fix the potentials at the base electrodes and prevent them from "floating," biasing resistors 19 and 20 are connected between the emitter and base of transistors 1 and 2 respectively; these latter resistors function in a well-known manner to render the transistor characteristics relatively insensitive to temperature variations.

The voltage-dividing base channels establish a potential difference across them which tends to permit current flow from the high potential side represented by conductor 4 into the emitter electrode of a given transistor, out through the base electrode, and through either or all of the base channels to the low potential side of the power supply represented by conductor 3. An input signal present, for example, at terminal X1 sufficient to raise the potential at that point above the potential of the base electrode would naturally prevent any base current from flowing in that one channel. However, base currents could still flow in either of the other two channels associated with transistor 1 and these base currents would maintain the transistor in a saturated condition rendering it "on" effectively like a closed switch in series with the load 5. The base currents in transistor 1 cease only when the potentials at each of the input terminals X1, Y1, and Z1 are raised to a level above that of the base. When this condition exists, i.e., when the bias on the base reverses, the transistor 1 instantly desaturates cutting off currents to its load 5. No special source of signals is required to place potentials of sufficient magnitude on any of the input terminals. For example, switches or additional transistors functioning as switches connecting these input terminals to the common positive lead 4 would be sufficient, and a signal input condition would correspond to the closing of any of these switches. The number of voltage dividing base channels need not be fixed at three, since the circuit could as well employ but two or more than three base channels connected in the same fashion.

It should be noted that the two transistors are cross-connected with the collector of transistor 1 connected to the input terminal Z2 of transistor 2 and the collector of transistor 2 connected to the input terminal Z1 of transistor 1. This cross connection, while permitting either transistor to be turned on, prevents them both from being turned on simultaneously. To illustrate why this is so, consider that each of the input terminals X1, Y1, X2, and Y2 is at or near the potential of line 4 and that transistor 1 is conducting. Because of this the collector of transistor 1 is near positive potential and, hence, so is the input terminal Z2. With all of its input terminals X2, Y2, and Z2 at positive potential transistor 2 is non-conducting and its collector is nearer the negative potential of line 3. Consequently, since input terminal Z1 is near negative potential sufficient base current flows through the third base channel of transistor 1 to keep it conducting. If, then, one of the input terminals of transistor 2 is momentarily made negative, transistor 2 immediately begins to conduct because of the bias current which flows in the one base channel. Because of the consequent shift of potential at Z1 to a more positive potential, the base current in transistor 1 ceases to flow and that transistor becomes non-conducting.

So much of the circuit as has already been described is not of itself the subject matter of this application. The modular transistor sub-circuit with multiple voltage dividing base channels as well as the cross connections of such sub-circuits to form a Memory unit is described and claimed in a copending patent application by P. J. de Fries for "Logic Circuit," Serial No. 810,116.

This invention contemplates the addition of certain modifications to such a Memory circuit or to other symmetrical flip-flp circuits and the like, which modifications result in providing the Permanent Memory function. In the embodiment shown in the drawing these modifications include a core structure 26 comprising two saturable magnetic cores 27 and 28. These cores are preferably formed of stacked laminations of a magnetic material having a low magnetizing force and a low flux density, such as one material available commercially as Hy Mu 80. The cores may be butted edge-to-edge as shown or placed side-by-side. A pair of windings 29 and 30 are also provided, one situated on each core and in series with one of the transistors 1 and 2 respectively, so that currents gated through either transistor must pass through its associated winding. As will be seen, windings 29 and 30 function not primarily as saturating windings for the core structure but as variable impedance windings whose impedance is controlled by the polarity of saturation induced in the core structure from another winding 31. The latter winding encircles both cores 27 and 28 and is connected across the collectors of the two transistors.

To illustrate the manner in which the core structure becomes saturated, it can be assumed that transistor 1 is conducting and that transistor 2 is therefore non-conducting. In this condition of the circuit the collector of transistor 1 is more positive than the collector of transistor 2. Consequently, the load current passed by transistor 1 will divide, a portion of it going through load 5 and another portion through saturating winding 31, voltage dropping resistor 32, and load 6. As a result of the current flowing in winding 31 both cores 27 and 28 saturate. As the dot convention associated with windings 29, 30, and 31 indicates, the direction of saturation is such that currents then flowing in winding 29 aid in the saturation whereas currents in winding 30 oppose it. Actually at this time very little current will flow in winding 30 partly because of the high impedance offered by the non-conducting transistor 2. It should be noted that as a result of the current in winding 31 and in voltage dropping resistor 32 an output signal of a certain polarity and magnitude appears across output terminals 33 and 34.

If one of the input terminals associated with transistor 2 momentarily becomes negative, the situation then reverses. For with transistor 2 switched to a conducting state as previously described and with tarnsistor 1 switched "off," the direction of current flow in saturating winding 31 is in exactly the opposite direction. The load current of transistor 2 then divides itself between load 6 on the one hand and winding 31 and load 5 on the other hand. Consequently, the saturable magnetic cores 27 and 28 become saturated with an opposite polarity. It may be said that the core is switched from negative to positive saturation. Now the current through winding 30 is in a direction to aid the positive saturation whereas the very small current in winding 29 opposes it. The shift in directions of current also has the effect of reversing the polarity of the output signal appearing across output terminals 33 and 34.

To illustrate the permanence of memory in this circuit it may be assumed that the power source represented by leads 3 and 4 is interrupted for an indefinite period of time. Naturally, as soon as the current ceases to flow in transistor 2, which is assumed to have been conducting, the transistor loses the ability it had while conducting to remember its condition. However, since each of the cores 27 and 28 was previously saturated in a positive direction, they will tend to remain in that condition due to residual magnetism. If power is now restored with input terminals X1, Y1, X2, and Y2 all at or near positive potential current tends to flow in both transistors. However, since both cores are already at or near positive saturation, current flows most easily through winding 30 while the current through winding 29 is limited because of its higher impedance, since core 27 must be in negative saturation before significant current can flow in that winding. In other words the flux in core 27 must be completely reversed before any significant current may flow in winding 29 whereas the flux in core 28 is already in the proper direction for current to flow in winding 30. Therefore transistor 2 is able to conduct almost immediately and, by reason of its conductance, it keeps transistor 1 turned "off." If power had gone off with the Memory unit in the opposite state, the operation of the device would have been similar except in the opposite mode.

To aid further in returning the circuit to its previous condition after interruption of power, the impedances of windings 29 and 30 are preferably proportioned to have a further useful effect on the biasing of their respective transistors. These windings in their low impedance condition offer an electrical resistance which is negligible in comparison with the other resistances in the circuit and which does not significantly alter the emitter-to-base bias of the conducting transistor. But in their high impedance condition, the potential dropped across either of the windings 29 and 30 is preferably high enough that the base is actually more positive than the emitter. Consequently, when power is restored in the circuit the previously non-conducting transistor is actually biased to cutoff. Thus, in two ways the magnetic circuit elements contribute to the reliability of the Permanent Memory: first, by creating a high impedance condition in series with the previously non-conducting valve; second, by reverse biasing the non-conducting valve. Both effects very strongly favor restoring the high current conducting condition to the previously conducting valve.

As can be seen, by a practice of this invention the Permanent Memory feature has been added to a basic Memory circuit with only a simple magnetic core structure and three windings which, when connected in circut, do not disturb the operation of the circuit. The delay in switching incurred by the use of magnetic components is, in my experience, on the order of five milliseconds or less and is more than fast enough for the vast majority of commercial control operations. Because of the symmetry of magnetic elements employed the invention applied particularly well to symmetrical bistable electrical circuits such as flip-flops or multivibrators, although the degree of symmetry will often depend on the use to be made of the circuit in the larger control system.

In is possible to connect the impedance windings 29 and 30 on the collector side of the transistors, although with the circuit otherwise as shown in the illustration not all of the advantages mentioned above will be obtainable. For example, the reverse bias on the non-conducting transistor would then not occur. Furthermore, it has been my experience that the cores 27 and 28 must then be made larger, a higher flux density material should then be used, and the speed of response of the circuit is reduced. The most important consideration to be kept in mind about the placement of the impedance windings is that, with whatever electrical valves they are employed, these windings should be connected in series with the valve so that most if not all of the gated currents, also pass through the impedance windings. The saturating winding 31, on the other hand, does not have to draw a major portion of the gated current as long as its ampere turns are sufficient to saturate both cores.

Since certain other variations within the scope of the present invention will doubtless occur to those skilled in the art to which the invention pertains, I wish it to be understood that the example set forth herein is primarily illustrative in nature and that the appended claims are intended to apply to all such variations as fall within the true spirit and scope of this invention.

What I claim as new and desire to secure by Letters Patent of the United States is:

1. An electrical circuit shiftable between bistable conditions comprising: a pair of direct voltage supply terminals; a pair of electronic valves connected to be supplied from said terminals and cross-connected to define a bistable circuit such that either of said valves may be in a high conduction state but not both simultaneously; means for shifting said circuit between its bistable conditions; a saturable magnetic core structure; a saturating winding inductively associated with said core structure and connected from an electrode of one of said valves to the corresponding electrode of the other to be energized by core-saturating direct currents of one polarity when one of said valves is in a high conduction state and of an opposite polarity when the other of said valves is in a high conduction state whereby the saturation of said core structure has a fixed polarity depending on the condition of said bistable circuit; and a pair of impedance windings associated with said core structure, each of said impedance windings being connected in series with a respective one of said valves, said impedance windings possessing by reason of the saturation of said core structure a high impedance when the valve associated therewith is in a low conduction state and possessing a low impedance when the valve associated therewith is in a high conduction state.

2. An electrical circuit shiftable between bistable conditions comprising a pair of direct voltage supply terminals; a pair of electronic valves connected to be supplied from said terminals and cross-connected with each other to define a bistable circuit such that either of said valves may be in a high conduction state but not both simultaneously; means for shifting said circuit between its bistable conditions; a pair of saturable magnetic cores; a saturating winding inductively associated with both of said cores and connected from an output terminal of one of said valves to the corresponding output terminal of the other of said valves to be energized by core-saturating direct currents of one polarity when one of said valves is in a high conduction state and of an opposite polarity when the other of said valve is in a high conduction state, whereby both of said cores are saturated by fluxes of a fixed polarity depending on the condition of said bistable circuit; and a pair of impedance windings one associated with each of said cores, each of said impedance windings being connected in series with a respective one of said valves, each of said impedance windings possessing by reason of the saturation of said cores a high impedance when the valve associated therewith is in a low conduction state and possessing a low impedance when the valve associated therewith is in a high conduction state.

3. A Permanent Memory electrical circuit shiftable between bistable conditions comprising: a pair of direct voltage supply terminals; a pair of electrical valves connected to be supplied from said terminals; electrical cross-connections from an output terminal of each of said valves to an output terminal of the other for producing a state of high current conduction in one of said valves corresponding to one of said bistable conditions and a state of high current conduction in the other of said valves corresponding to the other of said bistable conditions; means for shifting said circuit between its bistable conditions; a pair of saturable magnetic cores; saturating winding means inductively associated with both of said cores and connected from an output terminal of one of said valves to the corresponding output terminal of the other to be energized by core-saturating direct currents of one polarity when one of said valves is in a high conduction state and of an opposite polarity when the other of said valves is in a high conduction state, whereby both of said cores are saturated by fluxes of a fixed polarity depending on the condition of said bistable circuit; a pair of impedance windings one associated with each of said cores, each of said impedance windings being connected in series with a respective one of said valves, the current flow in each of said impedance windings being in a direction to aid the saturation fluxes when the respective valves associated therewith are in a high current conducting condition and to oppose the saturating fluxes when the respective valves associated therewith are not in a high current conducting condition, whereby upon interruption and restoration of power to said circuit the impedances of said impedance windings favor current flow in the valve which was last in a high current conducting condition prior to interruption of power.

4. An electrical circuit comprising: a pair of direct voltage supply terminals; a pair of transistors each having an emitter, a collector, and a base; said transistors being connected to be supplied from said terminals and cross-connected to define a bistable circuit such that either of said transistors may be in a high conduction state but not both simultaneously; a pair of saturable magnetic cores; a saturating winding inductively associated with both of said cores and connected to be energized by core-saturating direct currents of one polarity when one of said transistors is in a high conduction state and of an opposite polarity when the other of said transistors is in a high conduction state, whereby both of said cores are saturated by fluxes of a polarity depending on the condition of said bistable circuit; and a pair of impedance windings one associated with each of said cores, each of said impedance windings being connected in series with a respective one of said transistors, said impedance windings possessing by reason of the saturation of said cores a high impedance when the transistor associated therewith is in a low conduction state and a low impedance when the transistor associated therewith is in a high conduction state.

5. A Permanent Memory electrical circuit comprising: a source of direct current potentials; a pair of transistors each having an emitter, a collector, and a base, each of said transistors being connected across said source; a pair of input signal base circuits one connected to each of said transistor bases for selectively controlling the conduction of said transistors; means cross-connecting the collector of each transistor to the base circuit of the other transistor such that one or the other of said transistors may be in a high conduction state but not both simultaneously; a pair of saturable magnetic cores; a saturating winding inductively associated with both of said cores and connected across said collectors to be energized by cores saturating direct currents of one polarity when one of said transistors is in a high conduction state and of an opposite polarity when the other of said transistors is in a high conduction state, whereby both of said cores are saturated by fluxes of a polarity depending on the condition of said transistors; and a pair of impedance windings one associated with each of said cores, each of said impedance windings being connected in series with a respective one of said transistors on the emitter side thereof, said impedance windings possessing by reason of the saturation of said cores a high impedance when the transistor associated therewith is in a low conduction state and a low impedance when the transistor associated therewith is in a high conduction state.

6. A Permanent Memory electrical circuit comprising: a source of direct current potential; a pair of transistors each having an emitter, a collector, and a base, each of said transistors being connected across said source; a pair of load elements one in series with each transistor on the collector side thereof; a pair of control circuits one connected to each of said transistor bases for selectively controlling the conduction of said transistors; means cross-connecting the collector of each transistor to the control circuit of the other transistor such that one or the other of said transistors may be in a high conduction state but not both simultaneously; resistance biasing means connected between the base of each transistor and the emitter side of said source; a pair of saturable magnetic cores; a saturating winding inductively associated with both of said cores and connected across said collectors to be energized by cores saturating direct currents of one polarity when one of said transistors is in a high conduction state and of an opposite polarity when the other of said transistors is in a high conduction state, whereby both of said cores are saturated by fluxes of a polarity depending on the condition of said transistors; and a pair of impedance windings one associated with each of said cores, each of said impedance windings being connected in series with a respective one of said transistors on the emitter side thereof, said impedance windings possessing by reason of the saturation of said cores a high impedance when the transistor associated therewith is in a low conduction state and a low impedance when the transistor associated therewith is in a high conduction state, the high impedance value of each of said impedance windings being sufficient to place a reverse bias on the base of the transistor associated therewith.

References Cited in the file of this patent

UNITED STATES PATENTS

| | | |
|---|---|---|
| 2,740,086 | Evans | Mar. 27, 1956 |
| 2,916,729 | Paull | Dec. 8, 1959 |
| 2,939,115 | Bobeck | May 31, 1960 |